(12) United States Patent
Basra

(10) Patent No.: US 9,936,241 B2
(45) Date of Patent: Apr. 3, 2018

(54) METHOD AND APPARATUS FOR PROVIDING DYNAMIC CHANNEL AND CONTENT PROVISIONING

(71) Applicant: Cellco Partnership, Basking Ridge, NJ (US)

(72) Inventor: Arvind K. Basra, Glen Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 152 days.

(21) Appl. No.: 14/246,884

(22) Filed: Apr. 7, 2014

(65) Prior Publication Data

US 2015/0288997 A1    Oct. 8, 2015

(51) Int. Cl.
| | |
|---|---|
| H04N 21/262 | (2011.01) |
| H04N 21/25 | (2011.01) |
| H04N 21/6405 | (2011.01) |
| H04L 12/54 | (2013.01) |
| H04N 21/45 | (2011.01) |
| H04N 21/24 | (2011.01) |
| H04N 21/442 | (2011.01) |
| H04N 21/235 | (2011.01) |

(52) U.S. Cl.
CPC ... *H04N 21/26216* (2013.01); *H04L 12/5691* (2013.01); *H04L 12/5692* (2013.01); *H04N 21/2358* (2013.01); *H04N 21/24* (2013.01); *H04N 21/251* (2013.01); *H04N 21/262* (2013.01); *H04N 21/44209* (2013.01); *H04N 21/4524* (2013.01); *H04N 21/6405* (2013.01)

(58) Field of Classification Search
CPC .................................................. H04N 21/262
See application file for complete search history.

(56) References Cited

U.S. PATENT DOCUMENTS

| | | | |
|---|---|---|---|
| 8,866,911 B1* | 10/2014 | Sivertsen ............. | H04N 17/045 348/177 |
| 2009/0083780 A1* | 3/2009 | Beyabani ........... | H04N 7/17318 725/14 |
| 2009/0183218 A1* | 7/2009 | Li ..................... | H04N 21/23103 725/114 |
| 2010/0103934 A1* | 4/2010 | Li ....................... | H04L 12/1877 370/390 |
| 2011/0145215 A1* | 6/2011 | Montangero .......... | G06Q 30/02 707/709 |
| 2011/0231390 A1* | 9/2011 | Inagaki ............. | G06F 17/30864 707/721 |
| 2012/0047448 A1* | 2/2012 | Amidon ............. | G06Q 30/0204 715/753 |
| 2012/0221740 A1* | 8/2012 | Arsenio ............. | H04L 65/4076 709/231 |

(Continued)

*Primary Examiner* — Ricky Chin

(57) ABSTRACT

An approach for implementing a content provisioning platform for accurate provisioning of one or more dynamic multicast data channels (e.g., eMBMS) for initiating multicast transmission of contents. The approach includes analyzing content usage data to determine content consumption trend data associated with a topic in a service area. The approach also includes selecting a content package based on the topic, the content consumption trend data, or a combination thereof. Additionally, the approach includes provisioning a dynamic multicast data channel for initiating a multicast transmission of the content package to a plurality of devices in the service area.

20 Claims, 10 Drawing Sheets

(56) References Cited

U.S. PATENT DOCUMENTS

| | | | | |
|---|---|---|---|---|
| 2012/0278476 | A1* | 11/2012 | Agrawal | G06Q 50/01 709/224 |
| 2013/0254374 | A1* | 9/2013 | Bogdany | G06Q 50/01 709/224 |
| 2013/0281049 | A1* | 10/2013 | Lee | H04W 24/00 455/405 |
| 2014/0200036 | A1* | 7/2014 | Egner | H04W 8/245 455/456.3 |
| 2014/0358943 | A1* | 12/2014 | Raymond | G06Q 50/16 707/748 |
| 2014/0366052 | A1* | 12/2014 | Ives | H04N 21/23418 725/19 |
| 2015/0020135 | A1* | 1/2015 | Frusina | H04N 21/4621 725/116 |
| 2015/0032511 | A1* | 1/2015 | Haddad | G06Q 30/0205 705/7.34 |
| 2015/0289231 | A1* | 10/2015 | Basra | H04W 72/1242 370/312 |

* cited by examiner

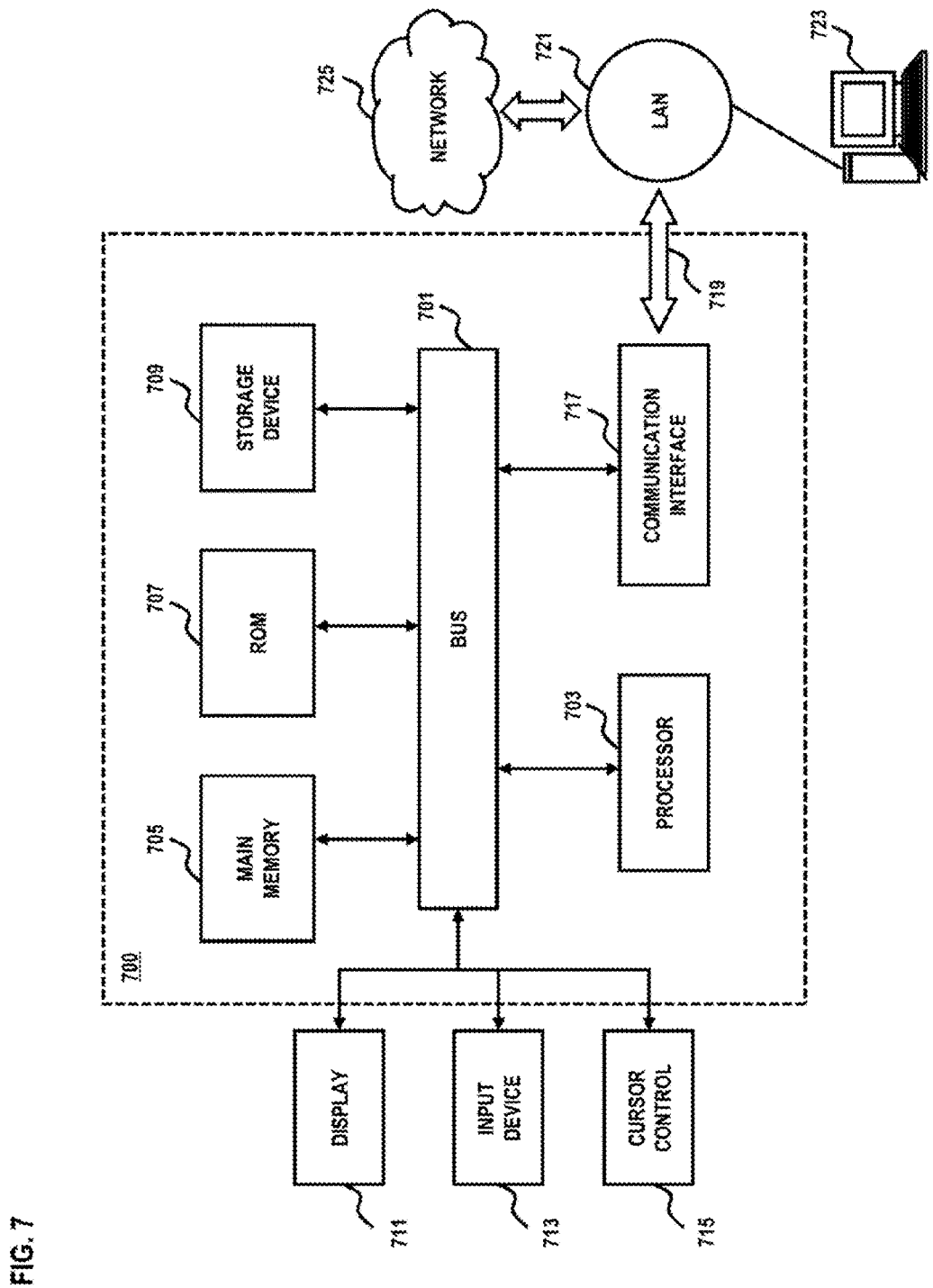

METHOD AND APPARATUS FOR PROVIDING DYNAMIC CHANNEL AND CONTENT PROVISIONING

BACKGROUND INFORMATION

With an increase in availability of contents (e.g., multimedia) on the Internet, generally a network operator/service provider monitors its network load/traffic for determining an increase or a trend in consumption (e.g., streaming, downloading, etc.) of contents in various service areas within the network so that the efficiency and throughput of the network channels can be managed. In one scenario, a plurality of users in a certain cell/service area of the network may request the same content (e.g., music files) associated with an event (e.g., a concert) in that service area, wherein a delivery of multiple copies of the same content could decrease the throughput of the network channel associated with that cell/service area. Additionally, it may be advantageous to the network operator and to its users if the operator, based on internal or external data, could anticipate contents requests and prepare the contents or related contents that may be of interest to the users in that service area. For effectuating content delivery in cellular networks, evolved multimedia broadcast multicast service (eMBMS) is the multicast standard for the Long Term Evolution (LTE) wireless communication standard, wherein an eMBMS session allows for a point-to-multipoint service in which the same data/content could be transmitted from a single source entity to multiple recipients (e.g., user devices). This method of transmitting the same content to multiple recipients allows for sharing of the network resources and network efficiency.

Based on the foregoing, there is a need for accurate provisioning of one or more dynamic multicast data channels for initiating multicast transmission of contents.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 7 is a diagram of a computer system that can be used to implement various embodiments.

DESCRIPTION OF THE PREFERRED EMBODIMENT

An apparatus, method and software for accurate provisioning of one or more dynamic multicast data channels for initiating multicast transmission of contents are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described for accurate provisioning of one or more dynamic multicast data channels (e.g., eMBMS) for initiating multicast transmission of contents, it is contemplated that these embodiments have applicability to a variety of processes and methods for identifying, scheduling, and provisioning data channels for delivery of contents to users in one or more service areas.

Figure 1:
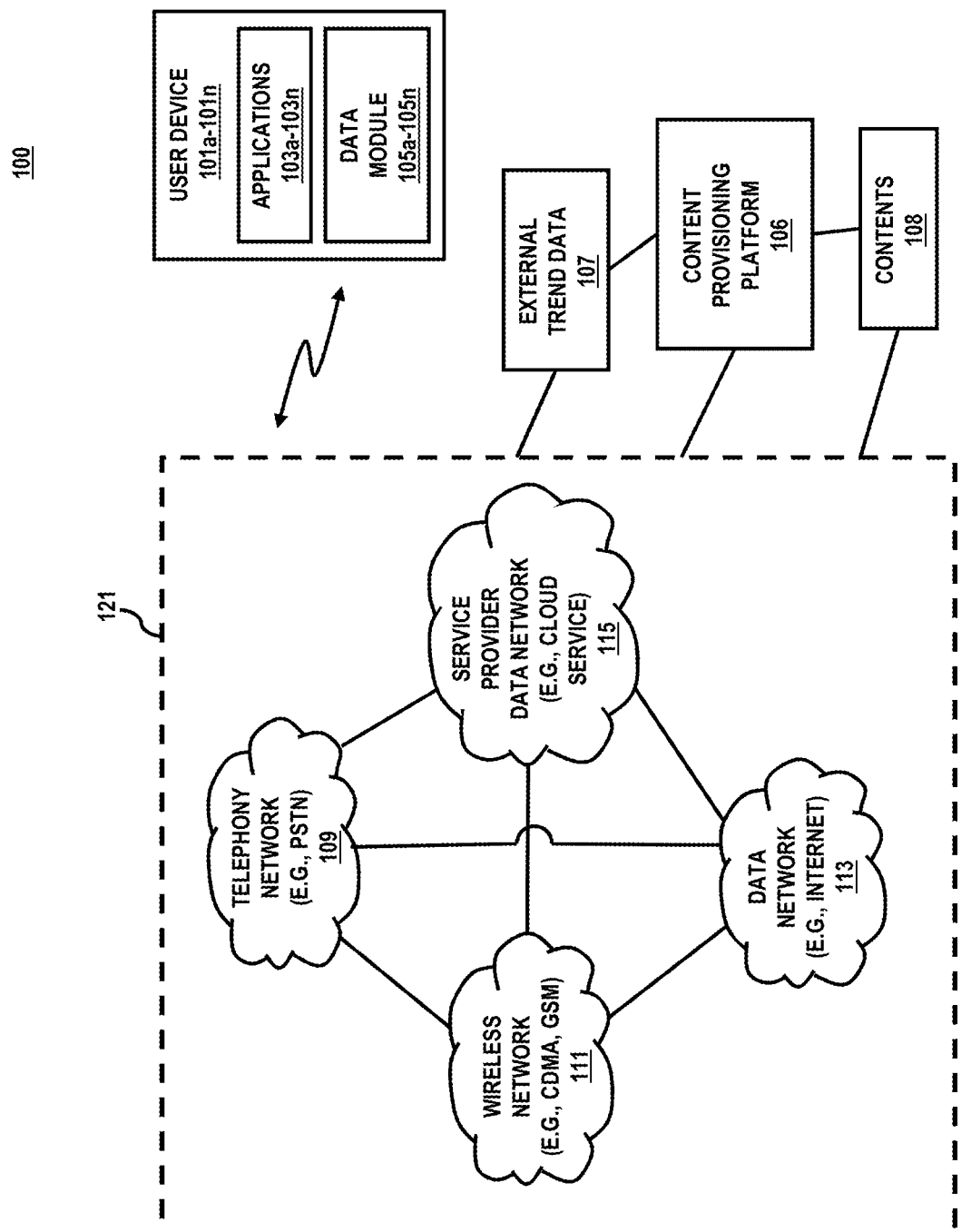
FIG. 1 is a diagram of a system capable of accurate provisioning of one or more dynamic multicast data channels for initiating multicast transmission of contents, according to one embodiment.

FIG. 1 is a diagram of a system for implementing accurate provisioning of one or more dynamic multicast data channels for initiating multicast transmission of contents. Generally, in a wireless communication network, multimedia content (e.g., music, video, weather reports, financial market updates, advertisements, etc.) can be delivered to users located in a network service area (e.g., a cell area) via a unicast (e.g., one-to-one) transmission mechanism where each user receives a copy of the content. For example, a live or pre-recorded stream of a sports event may be transmitted to each user in a service area where each unicast transmission session will require certain resources of a network. However, by using a multicast transmission method such as an eMBMS session, a network operator may take advantage of its efficiencies to transmit a single copy of the multimedia content item once, which can be received by a plurality of users in a service area. This multicast (e.g., one-to-many) distribution mode can be a valuable alternative to unicast when a large number of users are interested in the same content, wherein the multicast method allows for a more efficient use of the available spectrum and network resources of the network provider. Moreover, the eMBMS standards have specified a high-level mechanism to reserve network resources for multicasting in a session and to release those resources when the session ends.

Moreover, in a current design of eMBMS, a network operator may manually track content popularity and consumption and their effects on the network performance, and then provision a data channel and the content accordingly. However, potential inaccuracies and a slow response in determining or predicting content consumption; e.g., based on an event, topic, content consumption data, etc., or a delay in scheduling of the content for transmission may cause less than optimum network performance, user experience, and ultimately, a loss of revenue for the network operator. For example, a service provider may be unable to assess a sudden rise in content consumption or popularity until a sudden rise in the network traffic has had a negative effect on the network. Additionally, the service provider may monitor certain characteristics associated with content consumption while missing other factors that may soon impact the content consumption. For example, social networking data may indicate that an ad hoc gathering of several local artists (e.g., musicians) near a point of interest (POI) has drawn a large crowd of users (i.e., user devices) who may soon request content (e.g., album information) associated with the artists. Therefore, there is a need for accurate provisioning of one or more dynamic multicast data channels for initiating multicast transmission of contents.

To address these issues, system 100 of FIG. 1 provides the capability for accurate provisioning of one or more dynamic multicast data channels for initiating multicast transmission of contents, according to one embodiment. As previously discussed, in some situations, a service/content provider may wish to monitor content popularity and consumption over one or more network channels that the service provider may be managing so that the throughput of the channels remain within an acceptable flow rate or quality of service (QoS). In one scenario, a service provider may monitor the content consumption via one or more network monitors associated with the service provider's network. For example, a service provider may utilize analytics of its network to determine content consumption via one or more channels or cells associated with a given service area. The analytics may use one or more data mining techniques to process and analyze network data, which may be determined from data (e.g., non-voice, SMS, MMS, content request, content consumption, application downloads, etc.) transacted by users of the network. Further, the data may be processed and analyzed from many different dimensions or perspectives for categorizing, identifying, summarizing possible relationships, or ascertaining different data or content usage patterns. For example, the data may indicate patterns of content consumption, shopping patterns, users' habits, or the like. In various implementations, the analysis may be performed by various data mining or analysis algorithms, software, applications, or the like.

Additionally, the service provider may utilize social networking data that may indicate trending data associated with a content, geographical area, an event, a personality, or the like, wherein the trending data may be used as is or may be further analyzed to determine or predict user demand for similar or additional content. In one scenario, the trending data may be provided by an external service provider, which may use data from one or more social networking sources for compiling and providing the trending data to one or more other service providers.

In one embodiment, a network service provider may use a combination of internal data analytics and external trending data to determine content usage data in one or more service areas associated with the network service provider.

In one embodiment, a service provider may utilize a context aware algorithm for determining additional contents that may be of interest to users associated with the trending data in a service area. Further, the service provider may use predictive knowledge of user behavior related to consumption of content on various user devices where prediction of content usage may allow a service provider to change the time and the location of content delivery and opportunistically utilize available resources in its network. Provision of such services can increase network utilization/efficiency as well as improve user perceived service quality.

In one embodiment, the service provider may dynamically schedule one or more dedicated network channels for provisioning currently requested content or additional content associated with the currently trending content/data. For example, if the trending data indicates that a plurality of users are discussing a certain artist, then the service provider may identify content; e.g., multimedia, advertisements, event information, or the like that are associated with that artist and then signal a broadcast video provisioning service (BVPS) to start an eMBMS session dynamically and continuously schedule a package of most relevant contents for transmission to one or more service areas indicated by the trending data. In one scenario, the analytics that measured popularity of the content may signal to the BVPS to continuously schedule the package of the most relevant contents for delivery into the one or more service areas on a predefined eMBMS session dedicated for "hottest" contents.

For the purpose of illustration, the system 100 may include one or more user devices 101a-101n (user device 101), which may include, execute, and utilize one or more applications 103a-103n (also referred to as applications 103) and one or more data collection modules 105a-105n (also referred to as Data module 105).

Further, the system 100 may include a network system 121, which may include one or more networks, including a telephony network 109, a wireless network 111, a data network 113, a service provider data network 115, etc. By way of example, the networks 109, 111, 113, and 115 may be any suitable wireline and/or wireless network, which may be managed by one or more service providers. In one example, the networks 109, 111, 113, and 115 may be one or more elements in a network system 121, which may include various components and elements for providing a range of communication and network services. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Furthermore, the system 100 may include a content provisioning platform 106 (provisioning platform), which may be a standalone component or it may be implemented in one or more elements of the network system 121, for example, in the service provider data network 115. The provisioning platform may have access to external trend data 107, which may be provided by one or more service providers and/or content providers. In one scenario, the external trend data 107 may be determined by the service provider data network 115 and/or it may be provided by one or more external service providers, for example, by one or more online social networking service providers. In various embodiments, the external trend data 107 may be raw data, which can be processed by the provisioning platform and/or by one or more elements of the system 100 to determine content consumption trending data. In various scenarios, the external trend data 107 may include data associated with a plurality of service providers or it may be based on one or more subscription accounts associated with the provisioning platform and/or the service provider data network 115, wherein a social networking account may be utilized to follow and track various topics, content consumptions, events, or the like via one or more social networking service providers. Additionally, the provisioning platform may have access to various contents 108 (e.g., audio, video, images, text, etc.), which may be available as part of the network system 121 or may be provided by one or more content providers; for example, multimedia files, news updates, reports, or the like that may be available from their respective producers, owners, distributors, or the like.

Although depicted as separate entities, networks 109, 111, 113, and 115 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that networks 109, 111, 113, and 115 may include components and facilities to provide for signaling and/or bearer communications between the various components or facilities of system 100. In this manner, networks 109, 111, 113, and 115 may embody or include portions of a signaling system 7 (SS7) network, or other suitable infrastructure to support control and signaling functions.

By way of examples, the user devices 101 may communicate with other devices via one or more proximity-based communication channels or via one or more network service providers in the network system 121. Further, the applications 103 may include various applications for productivity, education, entertainment, social networking, web browser, communications, content sharing, multimedia applications, user interface (UI), map application, web client, or the like.

In one embodiment, a user device 101 may utilize a Data module 105 for determining/collecting data or content associated with the user device 101, one or more users of the user device 101, the applications 103, one or more content items (e.g., multimedia content), and the like. In addition, the user device 101 can execute an application 103 that is a software client for storing, processing, and/or forwarding one or more information items to other components of the system 100. In various embodiments, the Data module 105 may include various sensors for detecting and capturing various signals, information, and contents, for example, audio, video, location information, Bluetooth signals, near field communication (NFC) signals, wireless local area network (WLAN) signals, RFID signals, or the like. Further, the collected information, content, or signals may be shared, via the applications 103 with other user devices 101, the content provisioning platform 106, or with service providers in the network system 121.

It is noted that user devices 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone, set-top box, TV set, or any combination thereof. It is also contemplated that the user devices 101 can support any type of interface for supporting the presentment or exchanging of data. In addition, user devices 101 may facilitate various input means for receiving and generating information, including touch screen capability, keyboard and keypad data entry, voice-based input mechanisms and the like. Any known and future implementations of user devices 101 are applicable. In certain embodiments, user devices 101 may be configured to establish peer-to-peer communication sessions with each other using a variety of technologies, including near field communication (NFC), Bluetooth, ZigBee, infrared, etc. Also, connectivity can be provided via a wireless local area network (LAN). By way of example, a group of user devices 101 may be configured to a common LAN so that each device can be uniquely identified via any suitable network addressing scheme.

Figure 2:
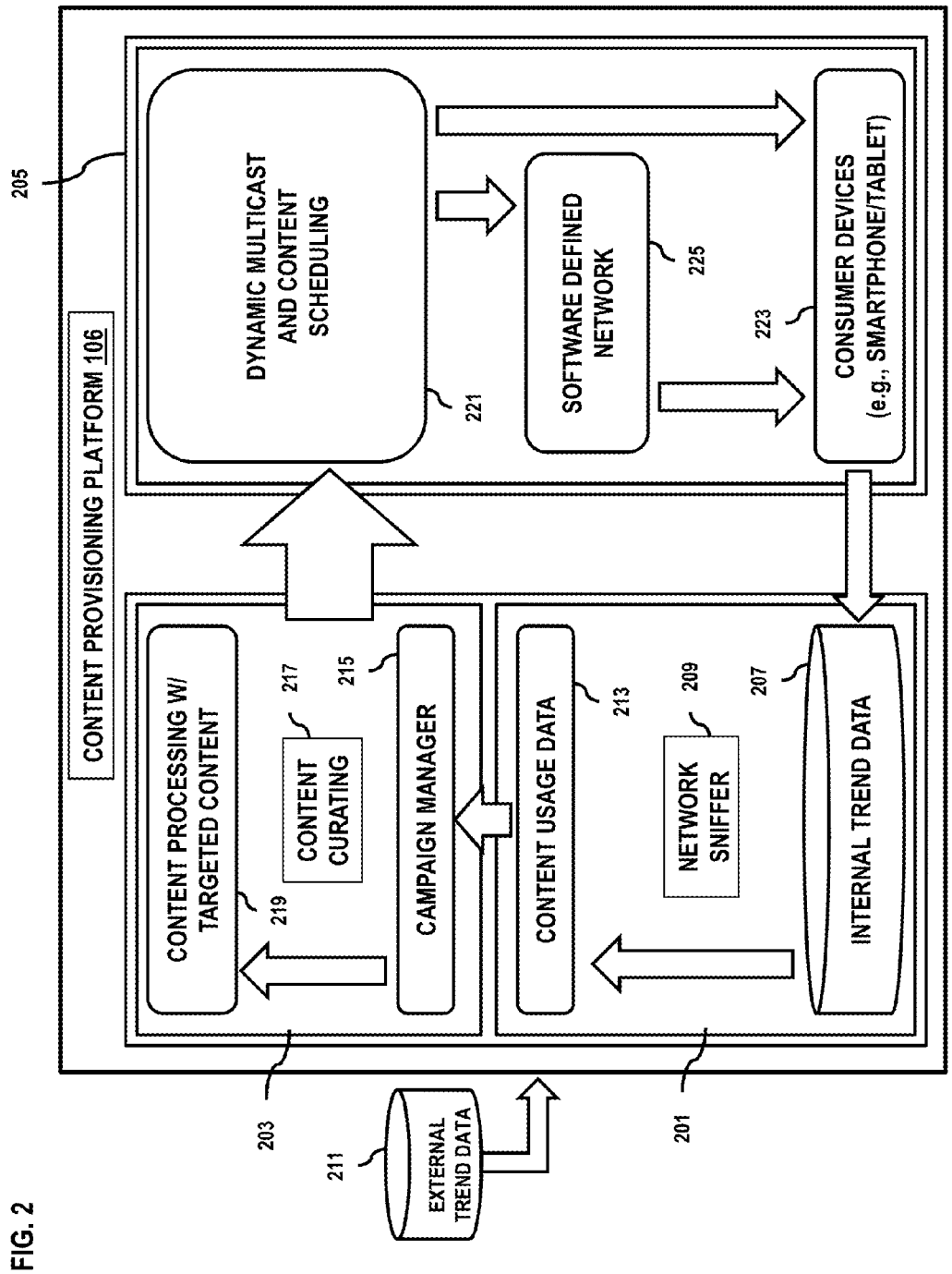
FIG. 2 is a diagram of the components of a content provisioning platform, according to one embodiment.

FIG. 2 is a diagram of the elements of a content provisioning platform, according to one embodiment. In various scenarios, the provisioning platform may be implemented as part of a service provider 115, a content provider, or the like. The content provisioning platform 106 may include various executable modules for performing one or more computing, data processing, or network based instructions that in combination provide a means for accurate provisioning of one or more dynamic multicast data channels for initiating multicast transmission of contents. Such modules can be implemented in hardware, firmware, software, or a combination thereof. By way of example, the provisioning platform may include a data analysis block 201, a content curation block 203, and a radio configuration block 205, wherein each block may include various modules and elements for performing various tasks associated with the provisioning platform. In addition, the provisioning platform may store or have access to local or remote storage devices for storing various data, configuration parameters, contents, or the like.

In one embodiment, the data analysis block 201 may utilize one or more modules and algorithms to analyze data associated with internal trend data 207, which may be captured and determined by a network sniffer 209 (e.g., traffic data monitor), and external trend data 211, which may be provided by one or more service/content providers, for determining content usage data 213. In one scenario, the internal trend data may be determined from user generated data including text messages, chat topics, content request/access data, Internet websites visited, or the like. Additionally, the internal data may categorized by content type, user device type, user information (e.g., male, female, professional, student, etc.) where the categories may be further filtered or combined for generating one or more contextual based data sets. In one scenario, the external trend data 211 may be provided by a data management/service provider that may use real-time or near real-time data, over a period of time, available from various sources. In one instance, the external trend data 211 may be already processed and can include certain attributes or characteristics, which may be filtered for determining trends associated with contents, topics, events, locations, etc. that users may be discussing.

In one embodiment, the analyzed data may be utilized to determine the content usage data 213, which may indicate content consumption or content interest by a plurality of users in one or more geographical areas, which may correspond to one or more service areas of a network service provider. For example, the analytics may indicate that a plurality of users in a certain service area is searching for certain contents associated with a topic of interest, an upcoming event, a point of interest, or the like.

In one embodiment, the content usage data 213 may be provided to the content curation block 203, for example, where a campaign manager module 215 may identify additional content that is related to contents, topics, events, or the like that were identified in the content usage data 213. For instance, the campaign manager 215 may select a variety of additional content items, for example, multimedia files, related advertisements, offers, coupons, or the like that are related to the contents identified in the content usage data 213. In one scenario, the additional content items may be provided by or may be associated with certain content/service providers who are interested in distributing their contents to the users in the identified service area. For example, a local merchant in the service area may wish to provide a discount offer to users who are currently in the service area and who are discussing a topic (e.g., an upcoming classis automobiles show in that area) that is related to merchandise/services (e.g., classic auto accessories) offered by that local merchant. In one scenario, the content curating module 217 may determine where the additional contents may be available at. For example, the additional contents may be available at a local or a remote storage device accessible to the provisioning platform. In another scenario, the content curating module 217 may determine that the additional contents would need to be requested from one or more content providers, wherein a content provider may determine the specific content it would like to deliver to the users in the identified service area or in one or more service areas of interest to the content provider. In one embodiment, the content curating module 217 may package the additional identified contents and provide the package to a content processing module 219, which may process and prepare the contents for delivery to the users in one or more service areas of the network service provider. For example, the content processing module 219 may determine the types of contents that are to be delivered to the users and if the contents should be preprocessed for a more efficient channel transmission or easier processing/usability at a receiving user device. In one scenario, the content processing module 219 may determine a proper sequence for presenting the contents so that they may add to the users' experience or provide a better value for the content providers associated with the contents. For example, on a college-sports topic, contents related to college sports teams may be sorted and sequentially presented as local college teams, state college teams, national college teams, etc., and additional contents from content providers may be presented based on their relations with those college teams.

In one embodiment, a selected package of contents may be provided to a dynamic multicast and content scheduling module 221, in the radio configuration block 205, for provisioning one or more dedicated multicast channels and delivery of the selected contents to a plurality of user devices 223 in one or more service areas. As noted, multicast and unicast radio channels may coexist in the same cell within a network and share the available capacity. A subset of available radio resources can temporarily be assigned to a multicast session, for example, from several minutes to several hours, and when the session is no longer active or reserved, the assigned radio and system resources can be reallocated for use by other services within the network. An eMBMS session may be activated for small geographical locations, such as stadiums or city centers, or for large areas, covering an entire city or region. In various scenarios, based on sufficient capacity in the network, multiple eMBMS sessions may be activated simultaneously. In one embodiment, the radio configuration block 205 may utilize a software defined network (SDN) 225 architecture, which can also dynamically manage and adapt the network channel configurations for provisioning of the one or more dedicated multicast channels and contents. In an SDN architecture, one or more applications may utilize an application programming interface (API) to dynamically modify any network switch/router rules/logic, for example, for optimizing, prioritizing, deprioritizing, and controlling the flow of data packets over a communication channel with different levels of control granularity.

As noted earlier, a provisioning platform may be implemented as a stand-alone element in the system 100 and interface with other elements of the system for provisioning the multicast channels and contents. Also, it is possible that the provisioning platform may be implemented as part of a service provider's system.

Figure 3:
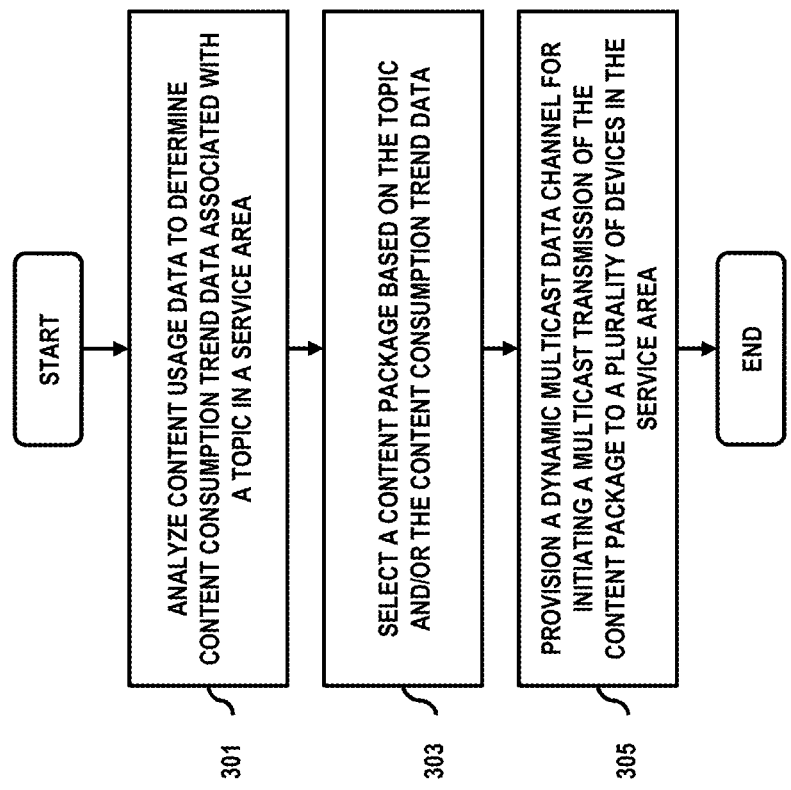
FIGS. 3 through 5 are flowcharts of processes for accurate provisioning of one or more dynamic multicast data channels for initiating multicast transmission of contents, according to various embodiments.
Figure 4:
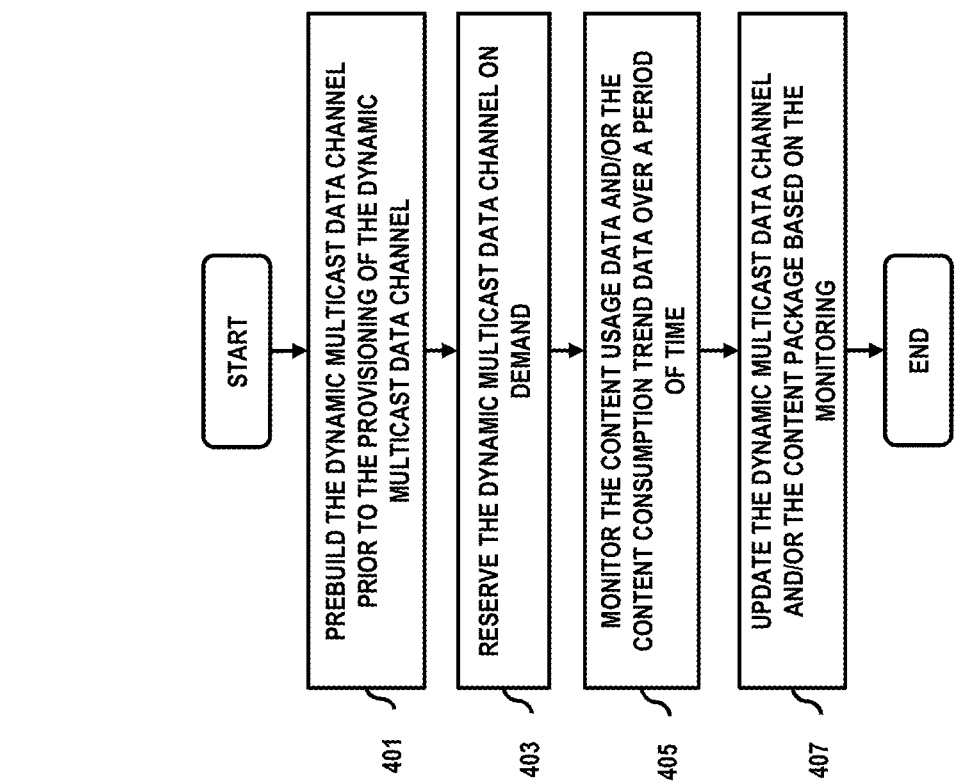
Figure 5:
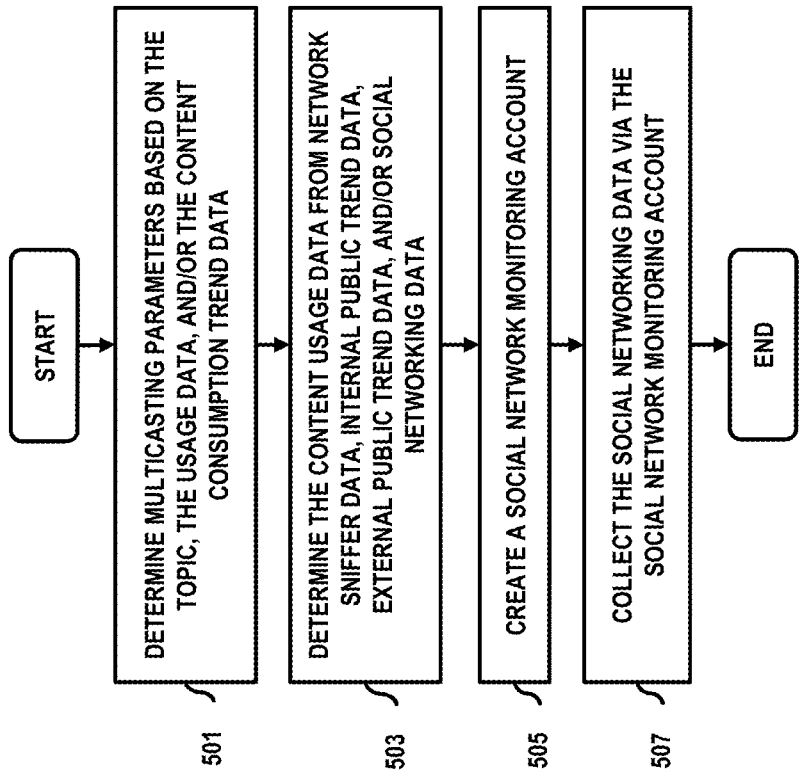

FIGS. 3 through 5 are flowcharts of processes for accurate provisioning of one or more dynamic multicast data channels for initiating multicast transmission of contents, according to various embodiments. It is noted that the steps of processes 300, 400, and 500 may be performed in any suitable order and by any of the components of the system 100, as well as combined or separated in any suitable manner. Further, for clarity in discussing the processes 300, 400, and 500, the provisioning platform is referred to as completing various steps of said processes; however, said processes and/or example steps described therein may be performed in any suitable order, wherein one or more of the steps may be optional.

As shown in FIG. 3, in step 301, a provisioning platform may analyze content usage data to determine content consumption trend data associated with a topic in a service area. In one embodiment, the provisioning platform may utilize one or more applications, algorithms, software, or the like to analyze a service provider's network data (e.g., user data). For example, a network operator can access the network data associated with the users of its network for determining content usage, topics of interest, possible events, or the like. In one embodiment, the usage data may include analysis of external public data, which may be available from one or more other service or content providers. For example, the external public data may be provided by a search-engine service provider, a social networking service provider, or the like. In one embodiment, the analysis may indicate that one or more users (e.g., user devices) in one or more service areas (e.g., geo-locations) are consuming or requesting same/similar content (e.g., multimedia content items) associated with one or more topics (e.g., artists, genre, etc.), wherein the consumption/request may be at the same/similar time period. For example, the content consumption trend data may indicate that at a certain point in time, a plurality of users at a certain city-center are requesting downloading/streaming of music files associated with a certain artist. In various examples, the consumption trending data may also indicate that the topic is related to a current event in the news, an upcoming event (e.g., a concert) at a geo-location, or the like.

In step 303, the provisioning platform may select a content package based on the topic, the content consumption trend data, or a combination thereof. In one embodiment, the provisioning platform may select one or more packages available locally or it may request the packages from one or more content providers. For example, if the content consumption trend data is associated with a certain artist, then the selected/requested packages may include music, photos, writings, videos, or the like that are associated with that artist. In one example, if the trend data is associated with an upcoming theatrical play, then the content packages may include information on the history of the play, artists in the play, tickets to the play, or the like. In one scenario, the content packages may include one or more advertisements, coupons, announcements, or the like that are associated with one or more content or service providers who may wish to present their contents when a particular content consumption trend data is detected. In one scenario, a content provider may determine the specific content it would like to deliver to the users in one or more service areas based on dynamic provisioning conditions associated with the content usage and the content provider. For example, a content provider may wish to change an advertisement, a discount offer, availability of new content, or the like.

In step 305, the provisioning platform may provision a dynamic multicast data channel for initiating a multicast transmission of the content package to a plurality of devices in the service area. In one embodiment, the provisioning platform may cause or request for a network service provider (e.g., a cellular network operator) to dynamically configure one or more multicast data channels for provisioning the selected content packages via one or more multicast transmissions to the users in one or more service areas of the service provider. In one embodiment, a multicast data channel is an eMBMS channel. In one embodiment, a multicast data channel may be scaled/reconfigured according to changes in the content consumption rate associated with the users in a given service area. For example, if the content consumption rate in a service area is growing rapidly, then the number of dedicated channels may be increased in order to maintain a certain level of QoS, for instance, a download rate.

The process 400 may begin at step 401 of the FIG. 4, where the provisioning platform may prebuild the dynamic multicast data channel prior to the provisioning of the dynamic multicast data channel. In one scenario, a provisioning platform may determine or predict, from the content usage data or from trending data, that a particular topic or content may become popular with or in demand by users in one or more service areas associated with a service provider. Further, the provisioning platform may prebuild/configure one or more multicast data channels before there is a rise in content consumption/request associated with that particular topic. For example, an analysis of chat data (e.g., texts, social networking, etc.) associated with a plurality of users in a service area may indicate a discussion of an ad hoc gathering of several writers at a local bookstore in a few hours, wherein the provisioning platform can prebuild a multicast data channel with available content related to the writers so that when users gather at the location of the bookstore, the multicast channel and the related content would be ready for delivery to the users in the service area of the local bookstore. In one example, offers from a popular coffee shop at a city center may be delivered to users of its mobile phone application via an eMBMS prebuilt session, or the mobile phone application may be offered for download via the eMBMS prebuilt session.

In step 403, the provisioning platform may reserve the dynamic multicast data channel on demand. In one embodiment, a service/content provider may request for reserving of a multicast data channel and/or one or more content packages in anticipation of a growth in content consumption/request, which may be associated with an event/topic in a given service area. In one scenario, the provisioning platform may reserve one or more multicast channels with various configurations or selected content packages, where the channels or the content packages may be associated with various service areas, topics, events, or the like.

In step 405, the provisioning platform may monitor the content usage data, the content consumption trend data, or a combination thereof over a period of time. In one embodiment, the provisioning platform may monitor the content usage data or the content consumption data associated with one or more service areas or communication channels for a duration of time, which may be predefined or may be at different intervals in order to determine any possible changes in the usage or consumption. In one example, the monitoring may be before or during the provisioning of a multicast channel or content to a service area.

In step 407, the provisioning platform may update the dynamic multicast data channel, the content package, or a combination thereof based on the monitoring. In various embodiments, the provisioning platform may cause or request an update to a multicast data channel or the contents provisioned via the data channel based on results of the monitoring of the content usage, content consumption data, QoS associated with the data channel, number of users associated with the data channel, or the like. For example, one or more data channels may be added if the monitoring data indicates that there is an increase in the consumption rate such that the capacity of an already dedicated channel is at a maximum. In one example, based on the usage or consumption trend data, a content package currently being provisioned may be updated to include certain new contents or exclude some currently provisioned content items. For instance, different advertisements from different vendors may be swapped in/out.

The process 500 may begin at step 501 of the FIG. 5, where the provisioning platform may determine one or more multicasting parameters based on the topic, the usage data, the content consumption trend data, or a combination thereof, wherein the multicast transmission is initiated based on the one or more multicasting parameters; and wherein the multicasting parameters include a scheduled time. In one scenario, the provisioning platform may determine one or more schedules for provisioning one or more multicast data channels and any selected content packages, wherein the schedules may be predetermined or may be determined dynamically. For example, topics associated with consumption trend data in a service area may indicate that the consumption rate may increase as the topic gains popularity among users in the service area and that scheduling of provisioning of related content at a certain time during the day will be provide additional capability to reach more users in the service area. In one example, a scheduled time may be based on the beginning, duration, or the ending of a certain event, e.g., a concert, where users may be more apt to request/consume additional contents associated with the event. In various scenarios, the popularity of a topic or certain contents may be determined from chat data among a group of users, sharing of certain contents among the users, social networking data, number of times a certain term is identified in the usage data, or the like.

In step 503, the provisioning platform may determine the content usage data from network sniffer data, internal public trend data, external public trend data, social networking data, or a combination thereof. In one embodiment, a provisioning platform may determine usage data associated with a service area by analyzing internal network data from its own network that are associated with users of that network. For example, a network operator can access the network data associated with the users of its network for determining content usage, topics of interest, possible events, or the like. In one embodiment, the usage data may be determined from external public data, which may be available from one or more service/content providers. For example, the external public trend data may be provided by a search-engine service provider, a social networking service provider, or the like. In one scenario, the external public trend data may be raw-data that can be processed and analyzed by a provisioning platform for determining content usage data associated with a service area, a plurality of users, or the like.

In step 505, the provisioning platform may create a social network monitoring account. In one scenario, a service provider or a provisioning platform may create one or more social networking accounts for monitoring information on topics, events, contents, or the like that users of the social network may be interested in, e.g., chatting about. For example, a provisioning platform may create several social networking accounts where each account is associated with a different social networking service provider. In various scenarios, the monitoring information may be received as part of the external public trending data or may be in addition to the external public trending data provided by one or more other service providers.

In step 507, the provisioning platform may collect the social networking data via the social network monitoring account. In various scenarios, the provisioning platform may process and analyze the social networking data for determining and collecting various information items from various social networking service providers, wherein the information can be used in determining content usage data associated with each service provider. In one example, different accounts may be utilized at different times for determining relevant content usage data appropriate for a given time, service area, content usage type, or the like.

Figure 6A:
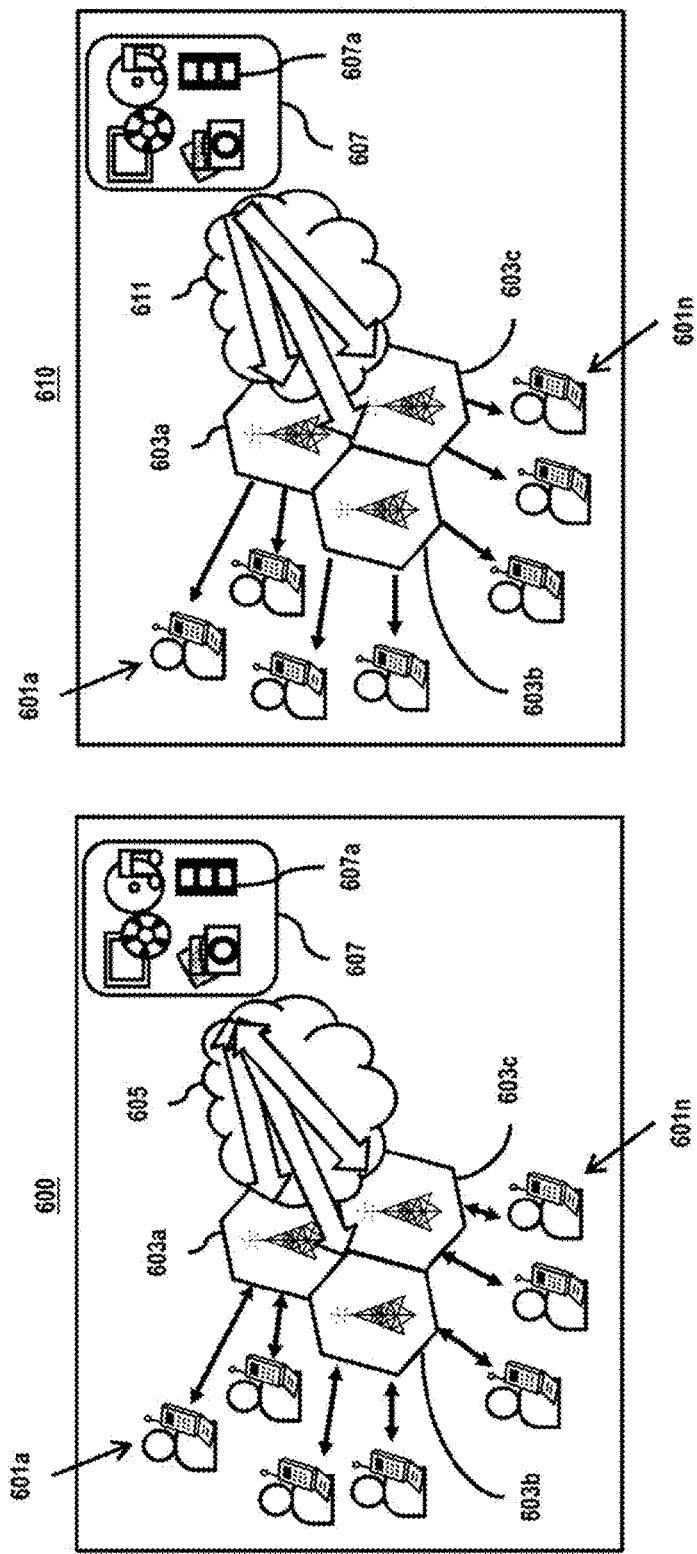
FIGS. 6A through 6C are diagrams of content provisioning system examples, according to various embodiments.
Figure 6B:
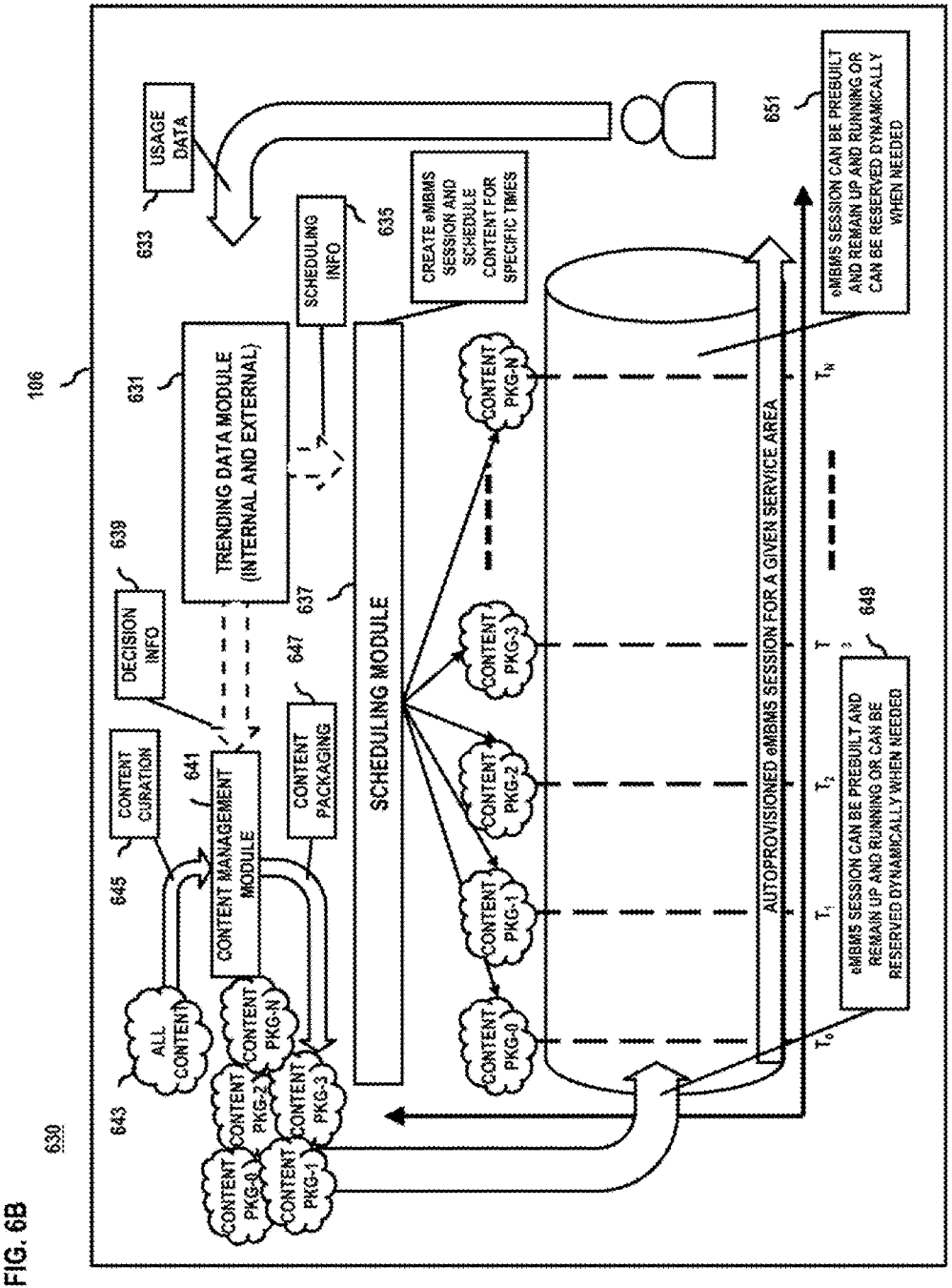
Figure 6C:
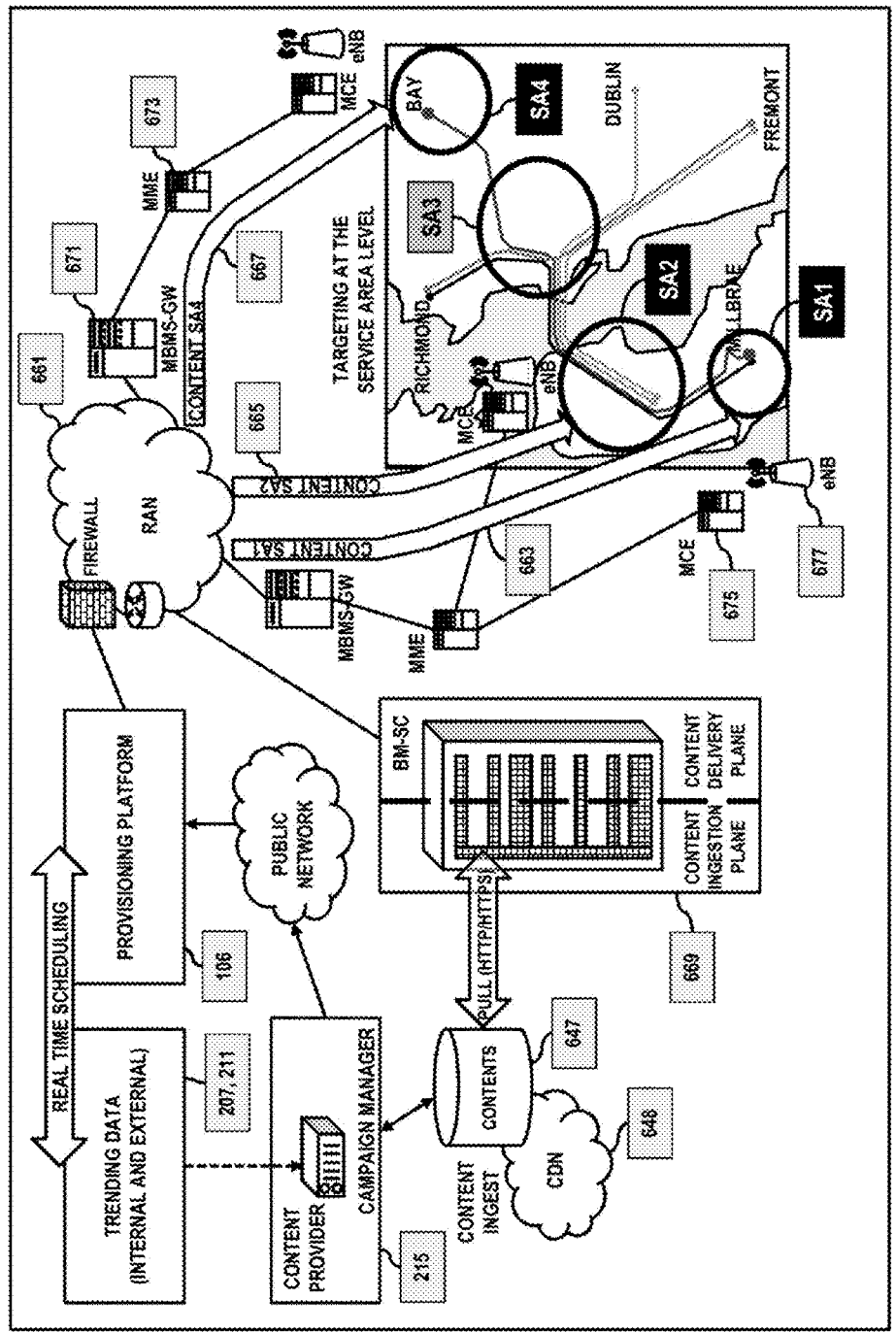

FIGS. 6A through 6C are diagrams of content provisioning system examples, according to various embodiments.

FIG. 6A includes an illustration of different scenarios for delivering contents to a plurality of users. In one example, diagram 600 includes a plurality of users/devices 601a-601n that may communicate with a respective communication node, e.g., a communication cell, 603a, 603b, and 603c, in order to connect to one or more service/content providers 605 for requesting and receiving one or more content items 607. In the example of the diagram 600, content items 607 are delivered to the users 601 via a unicast transmission mechanism 605, wherein each user device may receive a copy of a content item 607, wherein the multiple unicast transmissions will create a network load equivalent to the sum of the transmissions of the copies of content items delivered to the users. For example, if a copy of a content item 607a is delivered to seven users at 1 Mbps each, then the total network load would be 7 Mbps, which would not be a very efficient use of the network resources for delivering the same content item 607a to the plurality of users. However, in the example of diagram 610, the same copy of the content item 607a is delivered via a broadcast transmission mechanism 611, which would instead cause a network load of only 1 Mbps since only one copy of the content item 607a at 1 Mbps is transmitted to all of the users. As noted earlier, an eMBMS is a point-to-multipoint service in which data is transmitted from a single source entity to multiple recipients where transmitting the same data to multiple recipients allows network resources to be shared.

FIG. 6B includes diagram 630 where a content provisioning platform 106 can accurately provision one or more dynamic multicast data channels for initiating multicast transmission of contents, according to various embodiments. As noted, a provisioning platform can facilitate the creation of a dynamic and scalable data channel where users in a multicast area can receive the most popular or "hottest" available content without inundating a network (e.g., a cellular network) with persistent requests for the same content from each user (e.g., avoiding a unicast storm.) The diagram 630 includes elements as in the system 100 for provisioning a multicast channel and selected contents. In one embodiment, a trending data module 631 may process internal data associated with a network service provider and external trending data available from one or more other service/content providers to determine usage data 633 for determining content, topics, events, or the like that may be popular and trending among a plurality of users in one or more geo-locations/service areas. In one scenario, the trending data module 631 may determine and provide scheduling information 635 to a scheduling module 637 for creating one or more eMBMS sessions as well as scheduling various contents to be delivered to users at specific times. In one embodiment, the trending data module 631 may process the trending data and utilize decision information 639 to filter and provide the information to a content management module 641, which may request or access various contents 643 (e.g., multimedia, text, ads, etc.) from one or more local/remote content storage devices or from one or more content providers. Further, the contents can be curated at 645 for selecting from the variety of available contents, which may be packaged at 647 and for providing one or more content packages 649, PKG-0 to PKG-N, so that an eMBMS session 651 can be prebuilt, which can remain up and running or can be reserved dynamically as needed.

FIG. 6C includes an illustration of various geographical areas where multicast channels and contents are being provisioned by a provisioning platform. Diagram 660 illustrates another perspective of the system 100 where the provisioning platform 106 in conjunction with various components and elements of the system 100 can cause a radio access network (RAN) 661 to provision one or more multicast channels 663, 665, and 667 to deliver content SA1, content SA2, and content SA4 to their respective service areas SA1, SA2, and SA4. The architecture and components illustrated in the diagram 660 are examples of possible implementations and are not to be construed as required or as limiting for providing auto-provisioning support, wherein one or more components or their functionalities may be combined, substituted for, or not utilized. Additionally, some of the discussed components or their functionalities may be identified by or applicable to various communication standards, for example, the Third Generation Partnership Project (3GPP), and it is contemplated that the approaches of the various embodiments described herein may be applied without reference to such standards. It is noted, that a service provider may include a plurality of service areas where not all service areas receive a provisioning of a dedicated multicast channel or contents. For instance, in the example of the diagram 660, service area SA3 is not associated with a dedicated multicast channel; however, the system 100 may dynamically provision a dedicated multicast channel and contents if trending and usage data for the service area SA3 change. In the diagram 660, the system 100 includes a Broadcast/Multicast Service Center (BM-SC) 669, one or more Multimedia Broadcast/Multicast Services Gateways (MBMS GW) 671, one or more Mobility Management Entities (MME) 673, one or more Multi-cell/multicast Coordinating Entities (MCE) 675, and one or more evolved Node B (eNBs) 677. Generally, a BM-SC 669 can authorize users, schedule a session and transmission, service announcement, security, and content synchronization. Additionally, the BM-SC interfaces with the contents 647 for requesting and receiving contents from a content distribution network (CDN) 648. Further, an MBMS-GW 671 sends multicast packets to all MMEs 673, which provide the signals to all MCEs 675 and eNBs 677 that are part of an eMBMS session. Furthermore, an MCE 675 provides functionality for admission control, allocation of radio resources, and eMBMS session control signaling for radio configuration (e.g., modulation and coding scheme), wherein these functions may be implemented in another network element such as in an eNB. Moreover, an eNB 677 provides multicasting signaling (e.g., Internet protocol (IP)), terminates a multicast control channel, and signals to the user devices a beginning and an end of a multicast session.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The exemplary techniques and systems presented herein enables accurate provisioning of one or more dynamic multicast data channels for initiating multicast transmission of contents. As an advantage, a provisioning platform may be utilized to analyze content usage data to determine content consumption trend data associated with a topic in a service area. Further, the platform can select a content package based on the topic, the content consumption trend data, or a combination thereof. Additionally, the platform can provision a dynamic multicast data channel for initiating a multicast transmission of the content package to a plurality of devices in the service area, The processes described herein for accurate provisioning of one or more dynamic multicast data channels for initiating multicast transmission of contents may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
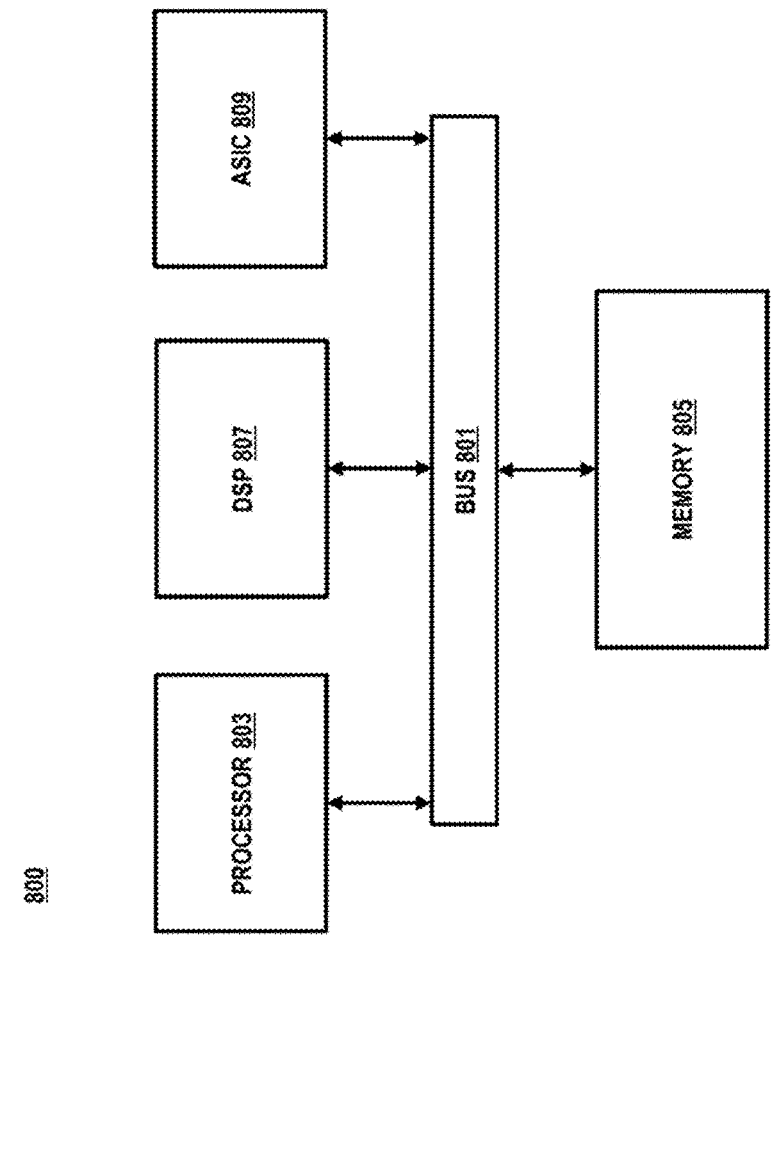
FIG. 8 is a diagram of a chip set that can be used to implement an embodiment of the invention.

FIG. 8 illustrates a chip set 800 upon which an embodiment of the invention may be implemented. Chip set 800 is programmed for accurate provisioning of one or more dynamic multicast data channels for initiating multicast transmission of contents and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 3-5.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
analyzing content usage data to determine content consumption trend data associated with a topic in a service area, wherein the content usage data includes information discussed by users of a wireless service provider, wherein the service area includes a particular cell area associated with the wireless service provider, and wherein analyzing the content usage data includes:
identifying a location, wherein the location includes the particular cell area and a cell area adjacent the particular cell area,
identifying a time period, and
determining that a plurality of users in the location are requesting information about the topic during the time period;
determining, based on the content consumption trend data, that the topic is related to an upcoming event in the particular cell area or in the cell area adjacent the particular cell area;
determining, based on the content consumption trend data and based on determining that the topic is related to the upcoming event, that an increase in demand for content associated with the topic is likely to occur in the particular cell area or in the cell area adjacent the particular cell area at a particular time;
aggregating, when it is determined that the increase in demand for the content associated with the topic is likely to occur, content associated with the topic prior to the increase in demand for the content associated with the topic;
building, prior to the particular time, a dynamic multicast data channel with the content; and
provisioning, in response to building the dynamic multicast data channel, the dynamic multicast data channel for initiating a multicast transmission of the content to a plurality of mobile devices in the service area,
wherein provisioning the dynamic multicast data channel includes allocating resources for the dynamic multicast data channel prior to the particular time.

2. A method of claim 1, further comprising:
reserving the dynamic multicast data channel on demand.

3. A method of claim 1, further comprising:
monitoring the content usage data, the content consumption trend data, or a combination thereof over a period of time; and
updating the dynamic multicast data channel, the content, or a combination thereof based on the monitoring.

4. A method of claim 1, further comprising:
determining one or more multicasting parameters based on the topic, the content usage data, the content consumption trend data, or a combination thereof,
wherein the multicast transmission is initiated based on the one or more multicasting parameters; and
wherein the one or more multicasting parameters include a scheduled time.

5. A method of claim 1, further comprising:
determining the content usage data from network sniffer data, internal public trend data, external public trend data, social networking data, or a combination thereof.

6. A method of claim 5, further comprising:
creating a social network monitoring account; and
collecting the social networking data via the social network monitoring account.

7. The method of claim 1, further comprising:
provisioning a second dynamic multicast data channel when a capacity of the dynamic multicast data channel is at a maximum.

8. An apparatus comprising:
a memory including computer program code for one or more programs, and
a processor to execute the computer program code to:
  analyze content usage data to determine content consumption trend data associated with a topic in a service area, wherein the content usage data includes information discussed by users of a wireless service provider, wherein the service area includes a particular cell area associated with the wireless service provider, and wherein, when analyzing the content usage data, the processor is configured to execute the computer program code to:
    identify a location, wherein the location includes the particular cell area and a cell area adjacent the particular cell area,
    identify a time period, and
    determine that a plurality of users in the location are requesting information about the topic during the time period;
  determine, based on the content consumption trend data, that the topic is related to an upcoming event in the particular cell area or in the cell area adjacent to the particular cell area;
  determine, based on the content consumption trend data and based on determining that the topic is related to the upcoming event, that an increase in demand for content associated with the topic is likely to occur in the particular cell area or in the cell area adjacent to the particular cell area at a particular time;
  aggregate, when it is determined that the increase in demand for the content associated with the topic is likely to occur, content associated with the topic prior to the increase in demand for the content associated with the topic;
  build, prior to the particular time, a dynamic multicast data channel with the content; and
  provision, in response to building the dynamic multicast data channel, the dynamic multicast data channel for initiating a multicast transmission of the content to a plurality of mobile devices in the service area,
  wherein, when provisioning the dynamic multicast data channel, the processor further executes the computer program code to allocate resources for the dynamic multicast data channel prior to the particular time.

9. An apparatus of claim 8, wherein the processor further executes the computer program code to:
reserve the dynamic multicast data channel on demand.

10. An apparatus of claim 8, wherein the processor further executes the computer program code to:
monitor the content usage data, the content consumption trend data, or a combination thereof over a period of time; and
update the dynamic multicast data channel, the content, or a combination thereof based on the monitoring.

11. An apparatus of claim 8, wherein the processor further executes the computer program code to:
determine one or more multicasting parameters based on the topic, the content usage data, the content consumption trend data, or a combination thereof,
wherein the multicast transmission is initiated based on the one or more multicasting parameters; and
wherein the one or more multicasting parameters include a scheduled time.

12. An apparatus of claim 8, wherein the processor further executes the computer program code to:
determine the content usage data from network sniffer data, internal public trend data, external public trend data, social networking data, or a combination thereof.

13. An apparatus of claim 12, wherein the processor further executes the computer program code to:
create a social network monitoring account; and
collect the social networking data via the social network monitoring account.

14. The apparatus of claim 8, wherein the processor further executes the computer program code to:
provision a second dynamic multicast data channel when a capacity of the dynamic multicast data channel is at a predetermined level.

15. A system comprising:
a content provisioning platform, comprising at least one processor, configured to:
  analyze content usage data to determine content consumption trend data associated with a topic in a service area, wherein the content usage data includes information discussed by users of a wireless service provider, wherein the service area includes a particular cell area associated with the wireless service provider, and wherein, when analyzing the content usage data, the content provisioning platform is further configured to:
    identify a location, wherein the location includes the particular cell area and a cell area adjacent to the particular cell area,
    identify a time period, and
    determine that a plurality of users in the location are requesting information about the topic during the time period;
  determine, based on the content consumption trend data, that the topic is related to an upcoming event in the particular cell area or in the cell area adjacent to the particular cell area;
  determine, based on the content consumption trend data and based on determining that the topic is related to the upcoming event, that an increase in demand for content associated with the topic is likely to occur in the particular cell area or in the cell area adjacent to the particular cell area at a particular time;
  aggregate, when it is determined that the increase in demand for the content associated with the topic is likely to occur, content associated with the topic prior to the increase in demand for the content associated with the topic;

build, prior to the particular time, a dynamic multicast data channel with the content; and provision, in response to building the dynamic multicast data channel, the dynamic multicast data channel for initiating a multicast transmission of the content a plurality of mobile devices in the service area, wherein, when provisioning the dynamic multicast data channel, the content provisioning platform is further configured to allocate resources for the dynamic multicast data channel prior to the particular time.

16. A system of claim 15, wherein the content provisioning platform is further configured to:

reserve the dynamic multicast data channel on demand.

17. A system of claim 15, wherein the content provisioning platform is further configured to:

monitor the content usage data, the content consumption trend data, or a combination thereof over a period of time; and update the dynamic multicast data channel, the content, or a combination thereof based on the monitoring.

18. A system of claim 15, wherein the content provisioning platform is further configured to:

determine one or more multicasting parameters based on the topic, the content usage data, the content consumption trend data, or a combination thereof, wherein the multicast transmission is initiated based on the one or more multicasting parameters; and wherein the one or more multicasting parameters include a scheduled time.

19. A system of claim 15, wherein the content provisioning platform is further configured to:

determine the content usage data from network sniffer data, internal public trend data, external public trend data, social networking data, or a combination thereof.

20. A system of claim 19, wherein the content provisioning platform is further configured to:

create a social network monitoring account; and collect the social networking data via the social network monitoring account.

\* \* \* \* \*